United States Patent
Song et al.

(10) Patent No.: US 9,641,271 B2
(45) Date of Patent: May 2, 2017

(54) TDM-BASED RESOURCE PARTITION BETWEEN TWO RADIO BASE STATIONS

(71) Applicant: Telefonaktiebolaget LM Ericsson (publ), Stockholm (SE)

(72) Inventors: Xinghua Song, Beijing (CN); Rui Fan, Beijing (CN); Shaohua Li, Beijing (CN); Qianxi Lu, Beijing (CN); Haochuan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 14/125,507

(22) PCT Filed: Jan. 31, 2013

(86) PCT No.: PCT/CN2013/071191
§ 371 (c)(1),
(2) Date: Dec. 11, 2013

(87) PCT Pub. No.: WO2014/117358
PCT Pub. Date: Aug. 7, 2014

(65) Prior Publication Data
US 2014/0286206 A1    Sep. 25, 2014

(51) Int. Cl.
*H04B 7/212* (2006.01)
*H04J 3/16* (2006.01)
(Continued)

(52) U.S. Cl.
CPC .......... *H04J 3/1694* (2013.01); *H04L 5/0032* (2013.01); *H04L 5/14* (2013.01);
(Continued)

(58) Field of Classification Search
CPC . H04J 11/0056; H04W 24/02; H04W 76/025; H04W 76/026; H04L 5/001; H04L 5/0035
See application file for complete search history.

(56) References Cited

U.S. PATENT DOCUMENTS

2011/0216676 A1* 9/2011 Li et al. .................. 370/281
2011/0305134 A1* 12/2011 Chung et al. ............ 370/216
(Continued)

FOREIGN PATENT DOCUMENTS

| CN | 101562903 A1 | 10/2009 |
| WO | 2012126302 A1 | 9/2012 |
| WO | 2014109688 A1 | 7/2014 |

OTHER PUBLICATIONS

International Search Report and Written Opinion dated Oct. 24, 2013 for International Application S/N: PCT/CN2013/071191, International Filing Date Jan. 31, 2013 consisting of 9-pages.
(Continued)

*Primary Examiner* — Alvin Zhu
(74) *Attorney, Agent, or Firm* — Christopher & Weisberg, P.A.

(57) ABSTRACT

The present disclosure discloses a method of Time Division Multiplexing (TDM)-based resource partition between two radio base stations (RBSs) with which a User Equipment (UE) is to perform dual connectivity and an associated radio network node. The method comprises the step of forming at least two non-overlapping Uplink (UL) subframe sets and at least two non-overlapping Downlink (DL) subframe sets. The method further comprises the step of allocating at least one of the UL subframe sets and at least one of the DL subframe sets exclusively to each of the RBSs.

20 Claims, 6 Drawing Sheets

(51) Int. Cl.
  *H04L 5/00* (2006.01)
  *H04L 5/14* (2006.01)
  *H04W 28/16* (2009.01)
  *H04W 16/10* (2009.01)
  *H04L 1/18* (2006.01)
  *H04W 76/02* (2009.01)

(52) U.S. Cl.
  CPC ........... *H04W 16/10* (2013.01); *H04W 28/16* (2013.01); *H04L 1/1861* (2013.01); *H04L 5/0055* (2013.01); *H04L 5/1469* (2013.01); *H04W 76/025* (2013.01)

(56) References Cited

U.S. PATENT DOCUMENTS

| | | | |
|---|---|---|---|
| 2012/0071190 A1 | 3/2012 | Choi et al. | |
| 2012/0300641 A1* | 11/2012 | Chen et al. | 370/241 |
| 2013/0195066 A1* | 8/2013 | Lee et al. | 370/329 |
| 2013/0225188 A1* | 8/2013 | Seo et al. | 455/450 |
| 2013/0322357 A1* | 12/2013 | He et al. | 370/329 |
| 2014/0112280 A1* | 4/2014 | Lee et al. | 370/329 |

OTHER PUBLICATIONS

3GPP TS 36.213 V11.3.0 (Jun. 2013) 3rd Generation Partnership Project; Technical Specification Group Radio Access Network; Evolved Universal Terrestrial Radio Access (E-UTRA); Physical layer procedures (Release 11) consisting of 176-pages.

European Supplementary Search Report and Written Opinion dated Sep. 22, 2016 for European Application Serial No. 1 387 3592.3-1851, European Regional Phase Filing Date: Aug. 20, 2015 consisting of 8-pages.

3GPP RAN Workshop on Release 12 and Onwards, RWS120003, Title: "LTE Release 12 and Beyond," Conference Location and Date: Ljubljana, Slovenia, Jun. 11-12, 2012 consisting of 10-pages.

3GPP TR 36.828 V11.0.0 (Jun. 2012) 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) Interference Management and Traffic Adaptation (Release 11) Jun. 26, 2012 consisting of 109-pages.

International Preliminary Report on Patentability dated Apr. 20, 2015 for International Application S/N: PCT/CN2013/071191, International Filing Date Jan. 31, 2013 consisting of 8-pages.

* cited by examiner

TDM-BASED RESOURCE PARTITION BETWEEN TWO RADIO BASE STATIONS

TECHNICAL FIELD

The present disclosure generally relates to the technical field of radio communication systems, and particularly, to Time Division Multiplexing (TDM)-based resource partition between two radio base stations (RBSs).

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Within the umbrella work of small cell enhancements undertaken by the Third Generation Partnership Project (3GPP), a new transmission scheme known as dual connectivity is being standardized. The dual connectivity is defined from the User equipment (UE)'s perspective, with its name suggesting that the UE communicates with two different RBSs via simultaneous communication connections. The RBSs involved in the dual connectivity may operate on the same frequency or separate frequencies. Each of the RBSs may or may not define a stand-alone cell.

By way of example, FIG. 1 schematically illustrates a common scenario of the dual connectivity, wherein a UE performs two-way communications with two RBSs (e.g., a macro RBS and a pico RBS).

Although many similarities are shared by dual connectivity, carrier aggregation and Coordinated Multi-Point (CoMP), the dual connectivity is less demanding on backhaul delay and synchronization between different network points as compared with the carrier aggregation and the CoMP.

A straightforward implementation for dual connectivity would be having a high-profile UE capable of simultaneously transmitting to and receiving from different RBSs perform dual connectivity with two RBSs. Although less system design effort needs to be made for this implementation, the complexity and thus the cost of the high-profile UE are relatively high. In the scenario where the dual connected RBSs operate on separate frequencies, the complexity of the UE would be further increased because the UE needs to support Uplink (UL) dual frequency carriers. In the scenario where the dual connected RBSs operate on the same frequency, there would be some "dead zones" (e.g., in the vicinity of the pico RBS), where the UE cannot hear from the RBSs simultaneously due to a large difference in dynamic range between two Downlink (DL) signals. Another disadvantage of this implementation is that inter-modulation products may result from superposition of more than one UL signals at each RBS.

For UEs incapable of simultaneously transmitting to and receiving from different RBSs to achieve dual connectivity, a different implementation based on TDM-based resource partition between dual connected RBSs may be applied. Although this implementation becomes more complicated in system design, it allows UEs incapable of simultaneously transmitting to and receiving from different RBSs to achieve dual connectivity and thus significantly reduces the requirements on UE complexity. Moreover, when this implementation is applied, the UE does not need to monitor scheduling grants from the dual connected RBSs and the problem with inter-modulation products does not exist.

SUMMARY

An object of the present disclosure is to provide a novel solution for TDM-based resource partition between two RBSs with which a UE is to perform dual connectivity.

A further object of the present disclosure is to provide a corresponding dual connectivity enabled UE and a method performed by the UE to achieve dual connectivity with the RBSs.

According to a first aspect of the disclosure, there is provided a method of TDM-based resource partition between two RBSs with which a UE is to perform dual connectivity. The method comprises the step of forming at least two non-overlapping UL subframe sets and at least two non-overlapping DL subframe sets. The method further comprises the step of allocating at least one of the UL subframe sets and at least one of the DL subframe sets exclusively to each of the RBSs.

The method may be carried out individually by one of the RBSs or a network node coupled to all the RBSs, or jointly by the RBSs.

According to a second aspect of the disclosure, there is provided a radio network node adapted to perform TDM-based resource partition between two RBSs with which a UE is to perform dual connectivity. The radio network node comprises a subframe set forming unit and a subframe set allocating unit. The subframe set forming unit is configured to form at least two non-overlapping UL subframe sets and at least two non-overlapping DL subframe sets. The subframe set allocating unit is configured to allocate at least one of the UL subframe sets and at least one of the DL subframe sets exclusively to each of the RBSs.

The radio network node may be one of the RBSs, or a network node coupled to all the RBSs.

By forming and allocating non-overlapping UL and DL subframe sets according to the first and second aspects of the present disclosure, collisions between transmissions to dual connected RBSs and collisions between receptions from dual connected RBSs can be avoided, making it possible for UEs incapable of simultaneously transmitting to and receiving from different RBSs to achieve dual connectivity.

Moreover, with non-overlapping UL and DL subframe sets preformed, the allocation of UL and DL subframes to dual connected RBSs can be simply and flexibly performed in the unit of subframe set. As long as one UL subframe set and one DL subframe set are allocated exclusively to one RBS, collisions between transmissions to/receptions from dual connected RBSs can be avoided.

According to a third aspect of the disclosure, there is provided a dual connectivity enabled UE. The UE comprises a receiver, a transmitter, a memory and a processor. The processor is configured to control the receiver to receive UL subframe sets and DL subframe sets allocated to RBSs with which the UE is to perform dual connectivity, wherein the UL subframe sets respectively allocated to the RBSs are non-overlapping and the DL subframe sets respectively allocated to the RBSs are non-overlapping. The memory is configured to store the received UL subframe sets and DL subframe sets. The processor is further configured to control the transmitter to perform transmissions to the RBSs in the stored UL subframe sets allocated to the respective RBSs and to control the receiver to perform receptions from the RBSs in the stored DL subframe sets allocated to the respective RBSs.

According to a fourth aspect of the disclosure, there is provided a method for use in a dual connectivity enabled UE. The method comprises the step of receiving UL subframe sets and DL subframe sets allocated to RBSs with which the UE is to perform dual connectivity, wherein the UL subframe sets respectively allocated to the RBSs are non-overlapping and the DL subframe sets respectively allocated to the RBSs are non-overlapping. The method further comprises a step of performing dual connectivity with the RBSs by performing transmissions to the RBSs in the UL subframe sets allocated to the respective RBSs and performing receptions from the RBSs in the DL subframe sets allocated to the respective RBSs.

In this manner, a dual connectivity enabled UE may be informed of the UL subframe sets and DL subframe sets obtained by performing the TDM-based resource partition according to the present disclosure, and achieve dual connectivity.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Note that although terminology from 3GPP Long Term Evolution (LTE) has been used in this disclosure to exemplify the disclosure, this should not be seen as limiting the scope of the disclosure to only the aforementioned system. Other wireless systems, including Wideband Code Division Multiple Access (WCDMA), Worldwide Interoperability for Microwave Access (WiMax), Ultra Mobile Broadband (UMB) and Global System for Mobile Communications (GSM) may also benefit from exploiting the ideas covered within this disclosure.

Figure 1:
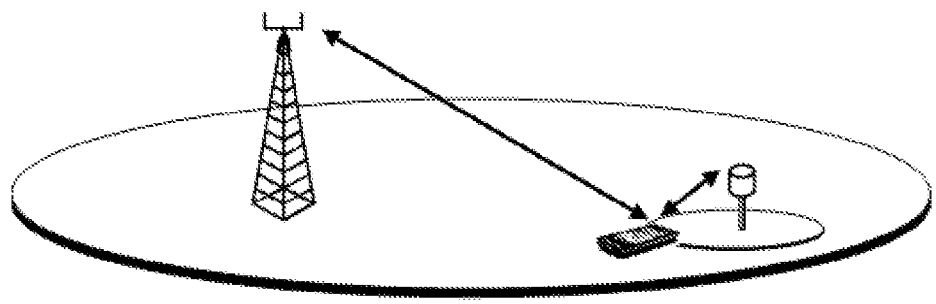
FIG. 1 is a diagram schematically illustrating an example scenario of dual connectivity wherein the present disclosure can be applied.
Figure 2:
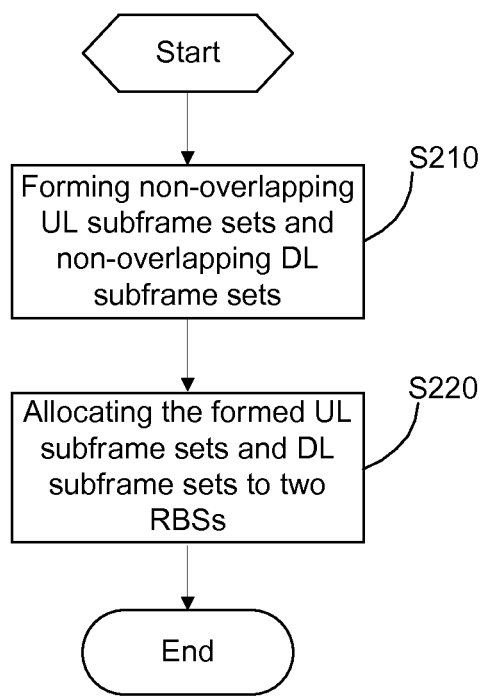
FIG. 2 is a flowchart schematically illustrating an example method of TDM-based resource partition between two RBSs according to the present disclosure.

FIG. 2 schematically illustrates an example method of TDM-based resource partition between two RBSs with which a UE is to perform dual connectivity according to the present disclosure.

As illustrated in FIG. 2, after a start of the method, non-overlapping UL subframe sets and non-overlapping DL subframe sets are formed (S210). In this step, at least two non-overlapping UL subframe sets and at least two non-overlapping DL subframe sets shall be formed, so that either RBS can be allocated with at least one UL subframe set and at least one DL subframe set. After step S210, at least one of the UL subframe sets and at least one of the DL subframe sets are allocated exclusively to each of the RBSs (S220). In this manner, collisions between transmissions to dual connected RBSs and collisions between receptions from dual connected RBSs can be avoided, making it possible for a UE incapable of simultaneously transmitting to and receiving from different RBSs to achieve dual connectivity. After step S220, the method is terminated.

The above method may be performed individually by one of the RBS involved in the dual connectivity or a network node coupled to all the RBS. The method may also be performed jointly by the RBSs, and in that case the allocation of the UL subframe sets and the DL subframe sets is coordinated between the RBSs through exchange of the allocated UL subframe sets and DL subframe sets (e.g. via X2 signaling).

The allocated UL subframe sets and DL subframe sets may be signaled to the UE via high-layer signaling in a bitmap manner. If the method is performed individually by one of the RBS involved in the dual connectivity or a network node coupled to all the RBS, the allocated UL subframe sets and DL subframe sets may be signaled to the UE by the RBS or radio network node performing the method. If the method is performed jointly by the RBSs, the allocated UL subframe sets and DL subframe sets may be signaled to the UE by either or both of the radio network nodes.

The allocation of UL and DL subframe sets may be based on traffic characteristics of communication links between the UE and the RBSs and/or the number of dual connectivity enabled UEs to be served by the RBSs. For example, if there is a higher data rate requirement on the DL and/or UL between the UE and one of the RBS, more DL and/or UL subframe sets can be allocated to the RBS as compared with the other RBS. If there are two UEs to be served by the RBSs, a part of the UL and DL subframe sets may be allocated for use by one of the UEs and the remaining part of the UL and DL subframe sets may be reserved to be allocated for use by the other UE.

Performing the above-described method of TDM-based resource partition under certain constraints may bring additional benefits.

For example, the TDM-based resource partition may be performed on a HARQ process level. That is to say, each UL subframe set and a corresponding DL subframe set may be formed from UL and DL subframes belonging to the same HARQ process and bundled together. In this manner, the same HARQ process can be allocated to a single RBS and completed faster. As compared with sharing the same HARQ process by different RBSs, this scheme significantly reduces the processing complexity and delay of HARQ processes.

Additionally, the UL grants, DL assignments and PDSCH of a RBS may be transmitted in the same DL subframe. The RBS can then transmit DL assignments, UL grants, HARQ-Acknowledgement (HARQ-AC K) feedback corresponding to UL data transmissions and DL data in the same DL subframe set, and receive HARQ-ACK feedback corresponding to DL data transmissions and UL data in the same UL subframe set. In this manner, many a DL/UL subframe may carry at least two kinds of information and resource utilization can be significantly increased.

The above-described method of TDM-based resource partition according to the present disclosure may be applied to both TDD and FDD schemes.

In the following, 8 examples of non-overlapping UL and DL subframe sets obtained by applying the TDM-based resource partition method under all constraints will be given. Those skilled in the art would appreciate that these examples are given for illustration purpose only and different non-overlapping UL and DL subframe sets may be obtained by applying the TDM-based resource partition method under fewer constraints.

The first example relates to FDD configuration. The HARQ timing for DL and UL transmissions in the FDD configuration has been given in [1].

Figure 3:
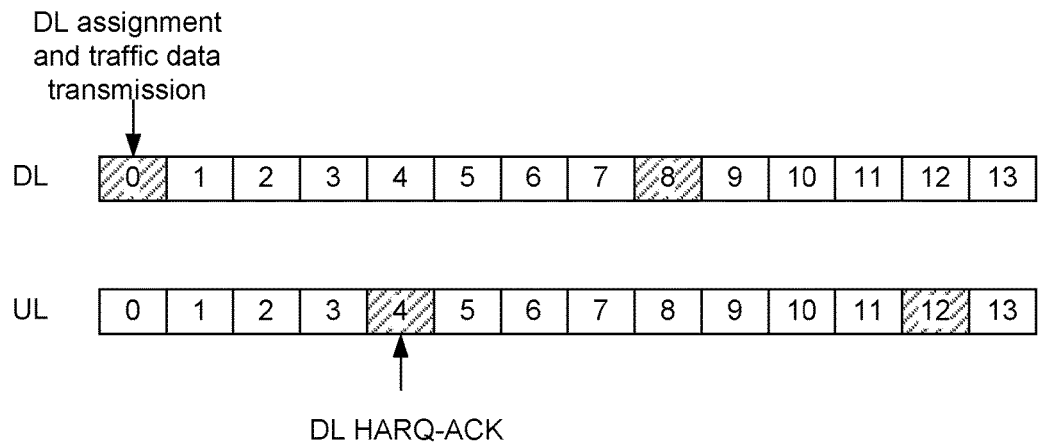
FIG. 3 is a diagram schematically illustrating an example of Hybrid Automatic Repeat Request (HARQ) timing for DL transmission in Frequency Division Duplex (FDD) configuration.

Specifically, for the DL transmission, if subframe n is allocated to one RBS for Physical Downlink Shared CHannel (PDSCH) transmission, this RBS is expected to receive HARQ-ACK feedback in respect to the PDSCH transmission in subframe n+4 from the UE. By way of example, FIG. 3 illustrates the HARQ timing for DL transmission in FDD configuration when subframe 0 is allocated for PDSCH transmission.

Figure 4:
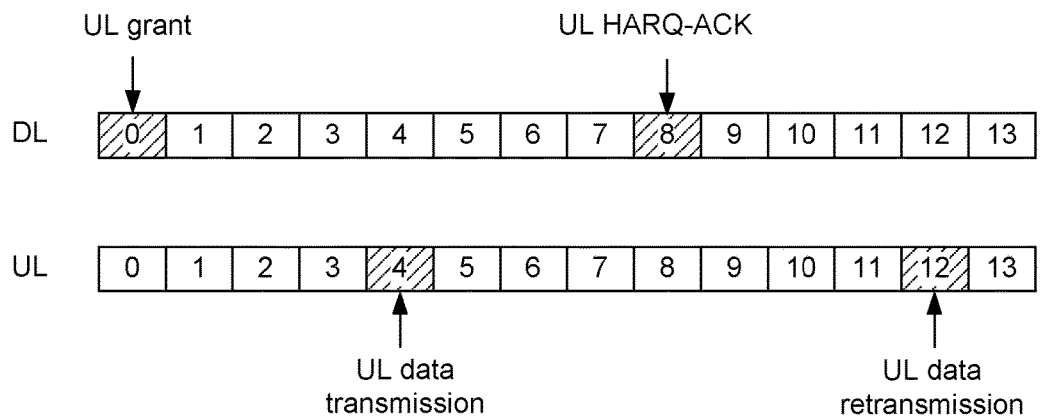
FIG. 4 is a diagram schematically illustrating an example of HARQ timing for UL transmission in FDD configuration.

For the UL transmission, if subframe n is allocated to one RBS for PUSCH transmission, this RBS is expected to send an UL grant in subframe n−4, to send HARQ-ACK feedback in respect to the Physical Uplink Shared CHannel (PUSCH) transmission in subframe n+4, and to retransmit PUSCH in subframe n+8. By way of example, FIG. 4 illustrates the HARQ timing for UL transmission in FDD configuration when subframe 4 is allocated for PUSCH transmission.

According to the HARQ timing for UL transmission, DL subframe sets each corresponding to an UL HARQ process and UL subframe sets each corresponding to the same UL HARQ process can be formed and bundled together. Both of the DL subframe set and the UL subframe set have a periodicity of 8 ms, and an UL subframe set has a delay of 4 ms relative to its corresponding DL subframe set.

All possible bundled subframe sets for FDD configuration are listed below, with D denoting a subframe number of a DL subframe and U denoting a subframe number of an UL subframe.

Set 1: D {0, 8, 16, ...} and U {4, 12, 20, ...};
Set 2: D {1, 9, 17, ...} and U {5, 13, 21, ...};
Set 3: D {2, 10, 18, ...} and U {6, 14, 22, ...};
Set 4: D {3, 11, 19, ...} and U {7, 15, 23, ...};
Set 5: D {4, 12, 20, ...} and U {8, 12, 20, ...};
Set 6: D {5, 13, 21, ...} and U {9, 13, 21, ...};
Set 7: D {6, 14, 22, ...} and U {10, 14, 22, ...}; and
Set 8: D {7, 15, 23, ...} and U {11, 15, 23, ...}.

Mathematically, the above subframe sets can be formulated as follows:

Set 1: {D|D=8*k, k=0, 1, 2, ...} and {U|U=8*k+4, k=0, 1, 2, ...};
Set 2: {D|D=8*k+1, k=0, 1, 2, ...} and {U|U=8*k+5, k=0, 1, 2, ...};
Set 3: {D|D=8*k+2, k=0, 1, 2, ...} and {U|U=8*k+6, k=0, 1, 2, ...};
Set 4: {D|D=8*k+3, k=0, 1, 2, ...} and {U|U=8*k+7, k=0, 1, 2, ...};
Set 5: {D|D=8*k+4, k=0, 1, 2, ...} and {U|U=8*k, k=0, 1, 2, ...};
Set 6: {D|D=8*k+5, k=0, 1, 2, ...} and {U|U=8*k+1, k=0, 1, 2, ...};
Set 7: {D|D=8*k+6, k=0, 1, 2, ...} and {U|U=8*k+2, k=0, 1, 2, ...}; and
Set 8: {D|D=8*k+7, k=0, 1, 2, ...} and {U|U=8*k+3, k=0, 1, 2, ...}.

One set can be allocated exclusively to either dual connected RBS, and each RBS can be allocated with one or more sets. For the sake of illustration, subframes belonging to set 1 are hatched in FIGS. 3 and 4.

The second to eighth examples relate to TDD configurations 0-6, respectively. The HARQ timing for DL and UL transmissions in the TDD configurations 0-6 has been given in [1].

Specifically, for the DL transmission, if subframe n is allocated to one RBS for PDSCH transmission, this RBS is expected to receive HARQ-ACK feedback in respect to the PDSCH transmission in subframe n+k from the UE. The definition of k is given in Table 10.1.3.1-1 in [1].

For the UL transmission, if subframe n is allocated to one RBS for PUSCH transmission, this RBS is expected to send an UL grant in subframe n−k, to receive HARQ-ACK feedback in respect to the PUSCH transmission in subframe n+k', and to retransmit PUSCH in subframe n+k". The definitions of k, k' and k" are also given in [1].

Figure 5:
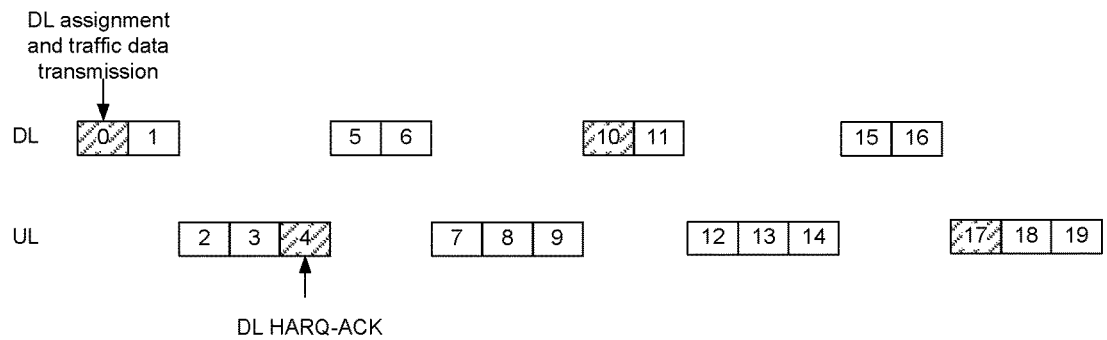
FIG. 5 is a diagram schematically illustrating an example of HARQ timing for DL transmission in Time Division Duplex (TDD) configuration 0.
Figure 6:
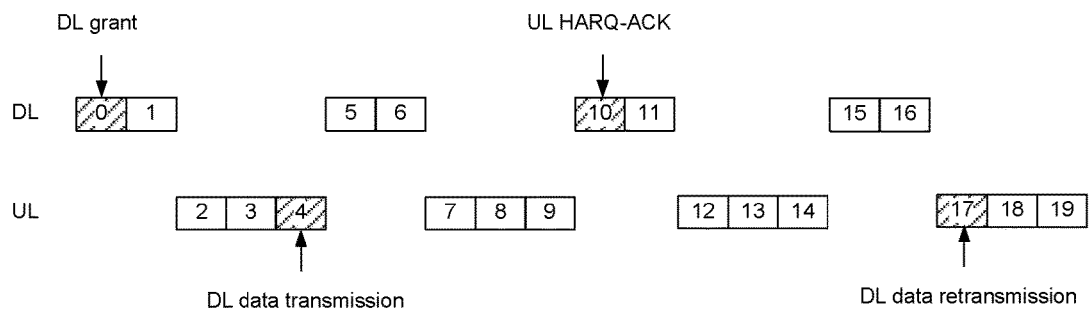
FIG. 6 is a diagram schematically illustrating an example of HARQ timing for UL transmission in TDD configuration 0.
Figure 7:
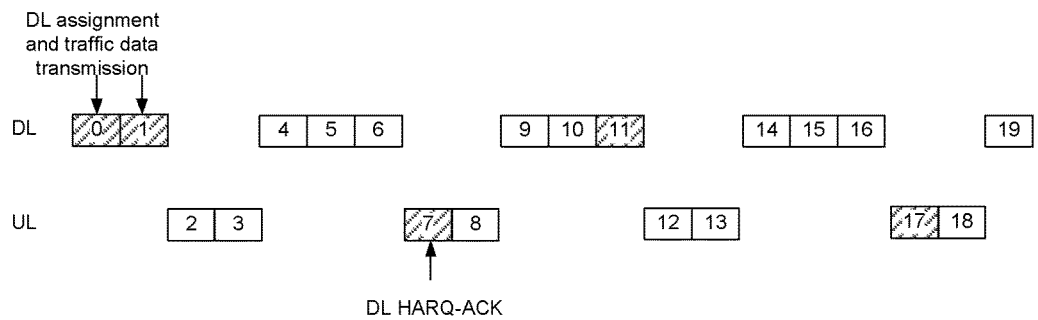
FIG. 7 is a diagram schematically illustrating an example of HARQ timing for DL transmission in TDD configuration 1.
Figure 8:
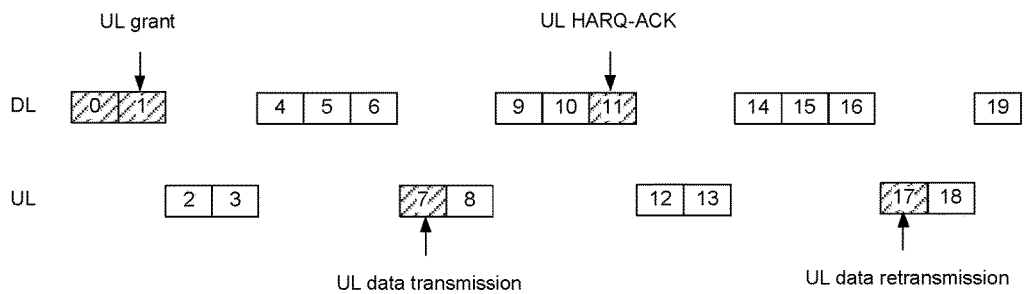
FIG. 8 is a diagram schematically illustrating an example of HARQ timing for UL transmission in TDD configuration 1.

By way of example, FIGS. 5 and 7 respectively illustrate the HARQ timing for UL transmission in TDD configurations 0 and 1 when subframe 0 is allocated for PDSCH transmission, FIG. 6 illustrates the HARQ timing for DL transmission in TDD configuration 0 when subframe 4 is allocated for PUSCH transmission, and FIG. 8 illustrates the HARQ timing for DL transmission in TDD configuration 0 when subframe 7 is allocated for PUSCH transmission.

According to the HARQ timing for UL transmission in TDD configuration 0, all bundled subframe sets corresponding to UL HARQ processes may be listed below, with D denoting a subframe number of a DL subframe and U denoting a subframe number of an UL subframe.

Set 1: D {0, 10, 21, 35, 45, 56, ...} and U {4, 17, 28, 39, 52, 63, ...};
Set 2: D {0, 11, 25, 35, 46, 60, ...} and U {7, 18, 29, 42, 53, 64, ...};
Set 3: D {1, 15, 25, 36, 50, 60, ...} and U {8, 19, 32, 43, 54, 67, ...};
Set 4: D {5, 15, 26, 40, 50, 61, ...} and U {9, 22, 33, 44, 57, 68, ...};
Set 5: D {5, 16, 30, 40, 51, 65, ...} and U {12, 23, 34, 47, 58, 69, ...};
Set 6: D {6, 20, 30, 41, 55, 65, ...} and U {13, 24, 37, 48, 59, 72, ...}; and
Set 7: D {10, 20, 31, 45, 55, 66, ...} and U {14, 27, 38, 49, 62, 73, ...}.

Mathematically, these subframe sets can be formulated as follows:

Set 1: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=0, X(1)=10, X(2)=21; Y(0)=4, Y(1)=17, Y(3)=28$;

Set 2: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=0, X(1)=11, X(2)=25; Y(0)=7, Y(1)=18, Y(3)=29$;

Set 3: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=1, X(1)=15, X(2)=25; Y(0)=8, Y(1)=19, Y(3)=32$;

Set 4: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=5, X(1)=15, X(2)=26; Y(0)=9, Y(1)=22, Y(3)=33$;

Set 5: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=5, X(1)=16, X(2)=30; Y(0)=12, Y(1)=23, Y(3)=34$;

Set 6: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=6, X(1)=20, X(2)=30; Y(0)=13, Y(1)=24, Y(3)=37$; and Set 7: $\{D|D=X(\text{mod}(k,3))+35*\text{floor}(k3), k=0, 1, 2, \ldots\}$ and
$\{U|U=Y(\text{mod}(k,3))+35*\text{floor}(k3), k=0, 1, 2, \ldots\}$,
where $X(0)=10, X(1)=20, X(2)=31; Y(0)=14, Y(1)=27, Y(3)=38$.

However, it should be noted that, in TDD configuration 0, the HARQ-ACK feedback corresponding to multiple UL transmissions may fall in the same DL subframe. Accordingly, different UL HARQ processes may have HARQ-ACK feedback (i.e., Physical Hybrid ARQ Indicator CHannel (PHICH)) in the same DL subframe. For example, both HARQ process 1 and HARQ process 2 have PHICH in subframe 0 and 35.

In this case, it is necessary to select, from the available 7 subframe sets, non-overlapping subframe sets to be allocated to the RBSs. By way of example, possible selection of the subframe sets can be {set 1, set 3, set 5}, {set 1, set 3, set 6}, {set 1, set 3, set 7}, {set 1, set 4, set 6}, {set 1, set 4, set 7}, {set 1, set 5, set 7}, {set 2, set 4, set 6}, {set 2, set 4, set 7}, {set 2, set 5, set 7} or {set 3, set 5, set 7}. Further, if set 1, set 3, set 5 are selected, set 1 and set 2 may be allocated to one of the RBS while set 3 may be allocated to the other RBS. For the sake of illustration, subframes belonging to set 1 are hatched in FIGS. 5 and 6.

The partitioning result based on the HARQ timing for UL transmission can be directly applied for DL transmission, i.e. the non-overlapping DL subframe sets can also be used for DL assignments and PDSCH transmissions.

According to the HARQ timing for UL transmission in TDD configuration 1, all bundled subframe sets corresponding to UL HARQ processes may be listed below, with D denoting a subframe number of a DL subframe and U denoting a subframe number of an UL subframe.

Set 1: D {1, 11, 21, 31, 41, 51, . . . } and U {7, 17, 27, 37, 47, 57, . . . };
Set 2: D {4, 14, 24, 34, 44, 54, . . . } and U {8, 18, 28, 38, 48, 58, . . . };
Set 3: D {6, 16, 26, 36, 46, 56, . . . } and U {12, 22, 32, 42, 52, 62, . . . }; and
Set 4: D {9, 19, 29, 39, 49, 59, . . . } and U {13, 23, 33, 43, 53, 63, . . . }.

As can be seen, all bundled subframe sets corresponding to UL HARQ processes are non-overlapping.

However, it is to be noted that, in TDD configuration 1, the HARQ-ACK feedback corresponding to DL transmissions in multiple DL subframes may fall in the same UL subframe. For example, DL transmissions in DL subframe 0 and DL subframe 1 have HARQ-ACK feedback in UL subframe 7. Similarly, DL transmissions in DL subframe 5 and DL subframe 6 have HARQ-ACK feedback in UL subframe 12. For such DL subframes to be allocated to the same RBS, it is preferable to include them in the same DL subframe set. To this end, the bundled subframe sets may be amended as follows.

Set 1: D {0, 1, 10, 11, 20, 21, 30, 31, 40, 41, 50, 51, . . . } and
U {7, 17, 27, 37, 47, 57, . . . };
Set 2: D {4, 14, 24, 34, 44, 54, . . . } and
U {8, 18, 28, 38, 48, 58, . . . };
Set 3: D {5, 6, 15, 16, 25, 26, 35, 36, 45, 46, 55, 56, . . . } and
U {2, 12, 22, 32, 42, 52, 62, . . . }; and
Set 4: D {9, 19, 29, 39, 49, 59, . . . } and
U {3, 13, 23, 33, 43, 53, 63, . . . }.

Mathematically, these subframe sets can be formulated as follows:

Set 1: $\{D|D=X(\text{mod}(k,2))+10*\text{floor}(k2), k=0, 1, 2, \ldots\}$ and
$\{U|U=10*k+7, k=0, 1, 2, \ldots\}$,
where $X(0)=0, X(1)=1$;

Set 2: $\{D|D=10*k+4, k=0, 1, 2, \ldots\}$ and
$\{U|U=10*k+8, k=0, 1, 2, \ldots\}$;

Set 3: $\{D|D=X(\text{mod}(k,2))+10*\text{floor}(k2), k=0, 1, 2, \ldots\}$ and
$\{U|U=10*k+2, k=0, 1, 2, \ldots\}$,
where $X(0)=5, X(1)=6$; and Set 4: $\{D|D=10*k+9, k=0, 1, 2, \ldots\}$ and
$\{U|U=10*k+3, k=0, 1, 2, \ldots\}$.

Similarly, for TDD configuration 2, all bundled subframe sets can be formulated as follows:

Set 1: $\{D|D=X(\text{mod}(k,4))+10*\text{floor}(k4), k=0, 1, 2, \ldots\}$ and
$\{U|U=10*k+7, k=0, 1, 2, \ldots\}$,
where $X(0)=0, X(1)=1, X(2)=3, X(3)=9$; and Set 2: $\{D|D=X(\text{mod}(k,4))+10*\text{floor}(k4), k=0, 1, 2, \ldots\}$ and
$\{U|U=10*k+4, k=0, 1, 2, \ldots\}$,
where $X(0)=4, X(1)=5, X(2)=6, X(3)=8$.

For TDD configuration 3, all bundled subframe sets can be formulated as follows:

Set 1: $\{D|D=10*k, k=0, 1, 2, \ldots\}$ and
$\{U|U=10*k+4, k=0, 1, 2, \ldots\}$; and Set 2: $\{D|D=X(\text{mod}(k,5))+10*\text{floor}(k5), k=0, 1, 2, \ldots\}$ and
$\{U|U=Y(\text{mod}(k2))+10*\text{floor}(k2), k=0, 1, 2, \ldots\}$,
where $X(0)=1, X(1)=5, X(2)=6, X(3)=7, X(4)=8; Y(0)=2, Y(1)=3$.

For TDD configuration 4, all bundled subframe sets can be formulated as follows:

Set 1: $\{D|D=10*k+8, k=0, 1, 2, \ldots\}$ and
$\{U|U=10*k+2, k=0, 1, 2, \ldots\}$; and Set 2: {D|D=10*k+9, k=0, 1, 2, . . . } and
  {U|U=10*k+3, k=0, 1, 2, . . . }.
For TDD configuration 6, all bundled subframe sets can be formulated as follows:
Set 1: {D|D=X(mod(k,2))+25*floor(k2), k=0, 1, 2, . . . } and
  {U|U=Y(mod(k2))+25*floor(k2), k=0, 1, 2, . . . },
  where X(0)=0, X(1)=11; Y(0)=7, Y(1)=18;
Set 2: {D|D=X(mod(k,2))+25*floor(k2), k=0, 1, 2, . . . } and
  {U|U=Y(mod(k2))+25*floor(k2), k=0, 1, 2, . . . },
  where X(0)=1, X(1)=15; Y(0)=8, Y(1)=22;
Set 3: {D|D=X(mod(k,2))+25*floor(k2), k=0, 1, 2, . . . } and
  {U|U=Y(mod(k2))+25*floor(k2), k=0, 1, 2, . . . },
  where X(0)=5, X(1)=16; Y(0)=12, Y(1)=23;
Set 4: {D|D=X(mod(k,2))+25*floor(k2), k=0, 1, 2, . . . } and
  {U|U=Y(mod(k2))+25*floor(k2), k=0, 1, 2, . . . },
  where X(0)=6, X(1)=19; Y(0)=13, Y(1)=24;
Set 5: {D|D=X(mod(k,2))+25*floor(k2), k=0, 1, 2, . . . } and
  {U|U=Y(mod(k2))+25*floor(k2), k=0, 1, 2, . . . },
  where X(0)=9, X(1)=20; Y(0)=14, Y(1)=27; and
Set 6: {D|D=X(mod(k,2))+25*floor(k2), k=0, 1, 2, . . . } and
  {U|U=Y(mod(k2))+25*floor(k2), k=0, 1, 2, . . . },
  where X(0)=10, X(1)=21; Y(0)=17, Y(1)=28.

For TDD configuration 5, there is only one UL process. It is not possible to apply the TDM-based resource partition method under all constraints. However, those skilled in the art would appreciate that non-overlapping UL and DL subframe sets may still be obtained by applying the TDM-based resource partition method under fewer constraints.

In the following, a structure of a radio network node 900 according to the present disclosure will be given with reference to FIG. 9. The radio network node 900 may be one of the RBSs to which a UE is to perform dual connectivity, or a network node coupled to all the RBSs.

Figure 9:
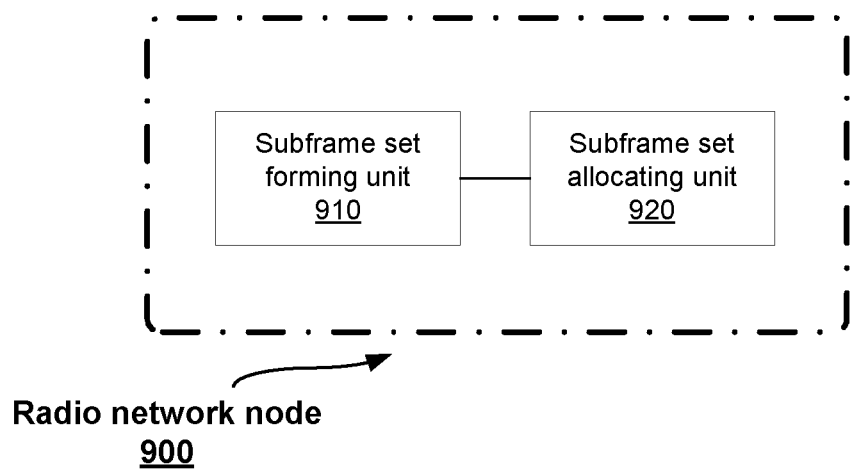
FIG. 9 is a block diagram schematically illustrating a structure of a radio network node according to the present disclosure.

As shown in FIG. 9, the radio network node 900 comprises a subframe set forming unit 910 and a subframe set allocating unit 920. The subframe set forming unit 910 is configured to form at least two non-overlapping UL subframe sets and at least two non-overlapping DL subframe sets. The subframe set allocating unit 920 is configured to allocate at least one of the UL subframe sets and at least one of the DL subframe sets exclusively to each of the RBSs.

In an embodiment, the subframe set forming unit 910 and the subframe set allocating unit 920 may be implemented by the same physical unit.

Figure 10:
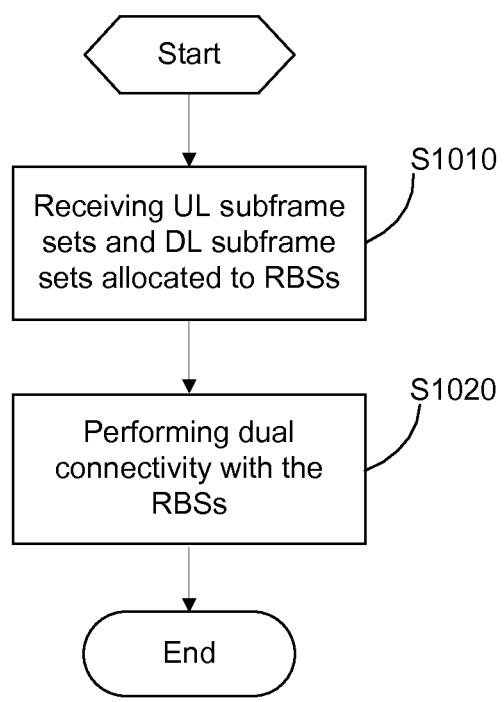
FIG. 10 is a flowchart schematically illustrating an example method for use in a dual connectivity enabled UE according to the present disclosure.

As a method performed by a UE to achieve dual connectivity with two RBSs, FIG. 10 illustrates that the UE receives UL subframe sets and DL subframe sets (S1010), and then performs dual connectivity with the RBSs (S1020). The UL subframe sets and DL subframe sets received at step S1010 are obtained by performing the TDM-based resource partition according to the present disclosure. Accordingly, the UL subframe sets respectively allocated to the RBSs are non-overlapping and the DL subframe sets respectively allocated to the RBSs are non-overlapping. At step S1020, the UE transmits to the RBSs in the UL subframe sets allocated to the respective RBSs and receives from the RBSs in the DL subframe sets allocated to the respective RBSs.

Figure 11:
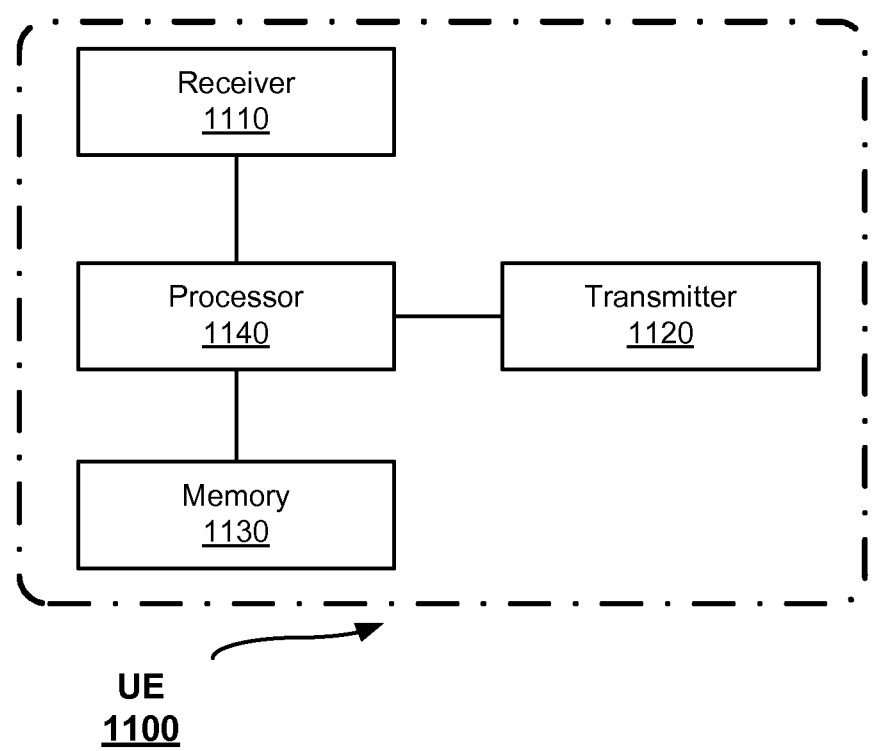
FIG. 11 is a block diagram schematically illustrating a structure of a dual connectivity enabled UE according to the present disclosure.

FIG. 11 is a schematic block diagram of a dual connectivity enabled UE 1100 according to the present disclosure. As shown, the dual connectivity enabled UE 1100 comprises a receiver 1110, a transmitter 1120, a memory 1130 and a processor 1140. The processor 1140 controls, e.g., according to instructions stored in the memory 1130, the receiver 1110 to receive UL subframe sets and DL subframe sets allocated to RBSs with which the UE is to perform dual connectivity, wherein the UL subframe sets respectively allocated to the RBSs are non-overlapping and the DL subframe sets respectively allocated to the RBSs are non-overlapping. The memory 1130 stores the received UL subframe sets and DL subframe sets. The processor 1140 further controls the transmitter 1120 to perform transmissions to the RBSs in the stored UL subframe sets allocated to the respective RBSs and controls the receiver 1110 to perform receptions from the RBSs in the stored DL subframe sets allocated to the respective RBSs.

It is to be noted that the term "processor" used herein shall also be construed to refer to other hardware capable of performing the same functions and/or executing software, and may include, without limitation, digital signal processor (DSP) hardware, reduced instruction set processor, hardware (e.g., digital or analog) circuitry, and (where appropriate) state machines capable of performing such functions.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method of Time Division Multiplexing (TDM)-based resource partition between two Radio Base Stations (RBSs) with which a User Equipment (UE) is to perform dual connectivity, the method comprising:
   forming at least two non-overlapping Uplink (UL) subframe sets and at least two non-overlapping Downlink (DL) subframe sets; and
   allocating at least one of the UL subframe sets and at least one of the DL subframe sets exclusively to each of the RBSs to perform dual connectivity.

2. The method according to claim 1, wherein the allocated UL subframe sets and DL subframe sets are signaled to the UE via high-layer signaling in a bitmap manner.

3. The method according to claim 1, wherein the method is carried out one of individually by one of the RBSs, a network node coupled to both of the RBSs, and jointly by the RBSs.

4. The method according to claim 3, wherein the allocation of the UL subframe sets and the DL subframe sets is coordinated between the RBSs through exchange of the allocated UL subframe sets and DL subframe sets, if the method is carried out jointly by the RBSs.

5. The method according to claim 1, wherein the allocation of UL and DL subframe sets is based on at least one of traffic characteristics of communication links between the UE and the RBSs and on the number of dual connectivity enabled UEs to be served by the RBSs.

6. The method according to claim 1, wherein each UL subframe set is bundled with a DL subframe set to form a bundled subframe set to be allocated to a single one of the RBS, wherein the UL subframe set includes UL subframes used for a Hybrid Automatic Repeat Request (HARQ) process and the DL subframe set includes DL subframes used for the HARQ process.

7. The method according to claim 6, wherein the single RBS transmits DL assignments, UL grants, HARQ-Acknowledgement (HARQ-ACK) feedback corresponding to UL data transmissions and DL data in the same DL subframe set and receives HARQ-ACK feedback corresponding to DL data transmissions and UL data in the same UL subframe set.

8. The method according to claim 7, wherein an UL subframe in the UL subframe set carries HARQ-ACK feedback for DL data carried by multiple DL subframes in the DL subframe set.

9. The method according to claim 6, wherein for Frequency Division Duplex (FDD) configuration, the bundled subframe set is one of the following:
Set 1: {D|D=8*k, k=0, 1, 2, . . . } and {U|U=8*k+4, k=0, 1, 2, . . . };
Set 2: {D|D=8*k+1, k=0, 1, 2, . . . } and {U|U=8*k+5, k=0, 1, 2, . . . };
Set 3: {D|D=8*k+2, k=0, 1, 2, . . . } and {U|U=8*k+6, k=0, 1, 2, . . . };
Set 4: {D|D=8*k+3, k=0, 1, 2, . . . } and {U|U=8*k+7, k=0, 1, 2, . . . };
Set 5: {D|D=8*k+4, k=0, 1, 2, . . . } and {U|U=8*k, k=0, 1, 2, . . . };
Set 6: {D|D=8*k+5, k=0, 1, 2, . . . } and {U|U=8*k+1, k=0, 1, 2, . . . };
Set 7: {D|D=8*k+6, k=0, 1, 2, . . . } and {U|U=8*k+2, k=0, 1, 2, . . . }; and
Set 8: {D|D=8*k+7, k=0, 1, 2, . . . } and {U|U=8*k+3, k=0, 1, 2, . . . },
wherein D denotes a subframe number of a DL subframe and U denotes a subframe number of an UL subframe.

10. The method according to claim 6, wherein for Time Division Duplex (TDD) configuration 0, the bundled subframe set is one of the following:
Set 1: {D|D=X(mod(k,3))+35*floor(k/3), k=0, 1, 2, . . . } and
{U|U=Y(mod(k,3))+35*floor(k/3), k=0, 1, 2, . . . }, where X(0)=0, X(1)=10, X(2)=21; Y(0)=4, Y(1)=17, Y(3)=28;
Set 2: {D|D=X(mod(k,3))+35*floor(k/3), k=0, 1, 2, . . . } and
{U|U=Y(mod(k,3))+35*floor(k/3), k=0, 1, 2, . . . }, where X(0)=0, X(1)=11, X(2)=25; Y(0)=7, Y(1)=18, Y(3)=29;
Set 3: {D|D=X(mod(k,3))+35*floor(k/3), k=0, 1, 2, . . . } and
{U|U=Y(mod(k,3))+35*floor(k/3), k=0, 1, 2, . . . }, where X(0)=1, X(1)=15, X(2)=25; Y(0)=8, Y(1)=19, Y(3)=32;
Set 4: {D|D=X(mod(k,3))+35*floor(k/3), k=0, 1, 2, . . . } and
{U|U=Y(mod(k,3))+35*floor(k/3), k=0, 1, 2, . . . }, where X(0)=5, X(1)=15, X(2)=26; Y(0)=9, Y(1)=22, Y(3)=33;
Set 5: {D|D=X(mod(k,3))+35*floor(k/3), k=0, 1, 2, . . . } and
{U|U=Y(mod(k,3))+35*floor(k/3), k=0, 1, 2, . . . }, where X(0)=5, X(1)=16, X(2)=30; Y(0)=12, Y(1)=23, Y(3)=34;
Set 6: {D|D=X(mod(k,3))+35*floor(k/3), k=0, 1, 2, . . . } and
{U|U=Y(mod(k,3))+35*floor(k/3), k=0, 1, 2, . . . }, where X(0)=6, X(1)=20, X(2)=30; Y(0)=13, Y(1)=24, Y(3)=37; and
Set 7: {D|D=X(mod(k,3))+35*floor(k/3), k=0, 1, 2, . . . } and
{U|U=Y(mod(k,3))+35*floor(k/3), k=0, 1, 2, . . . }, where X(0)=10, X(1)=20, X(2)=31; Y(0)=14, Y(1)=27, Y(3)=38, wherein D denotes a subframe number of a DL subframe and U denotes a subframe number of an UL subframe.

11. The method according to claim 8, wherein for TDD configuration 1, the bundled subframe set is one of the following:
Set 1: {D|D=X(mod(k,2))+10*floor(k/2), k=0, 1, 2, . . . } and
{U|U=10*k+7, k=0, 1, 2, . . . }, where X(0)=0, X(1)=1;
Set 2: {D|D=10*k+4, k=0, 1, 2, . . . } and
{U|U=10*k+8, k=0, 1, 2, . . . };
Set 3: {D|D=X(mod(k,2))+10*floor(k/2), k=0, 1, 2, . . . } and
{U|U=10*k+2, k=0, 1, 2, . . . }, where X(0)=5, X(1)=6; and
Set 4: {D|D=10*k+9, k=0, 1, 2, . . . } and
{U|U=10*k+3, k=0, 1, 2, . . . },
wherein D denotes a subframe number of a DL subframe and U denotes a subframe number of an UL subframe.

12. The method according to claim 6, wherein for TDD configuration 2, the bundled subframe set is one of the following:
Set 1: {D|D=X(mod(k,4))+10*floor(k/4), k=0, 1, 2, . . . } and
{U|U=10*k+7, k=0, 1, 2, . . . },
where X(0)=0, X(1)=1, X(2)=3, X(3)=9; and
Set 2: {D|D=X(mod(k,4))+10*floor(k/4), k=0, 1, 2, . . . } and
{U|U=10*k+4, k=0, 1, 2, . . . },
where X(0)=4, X(1)=5, X(2)=6, X(3)=8,
wherein D denotes a subframe number of a DL subframe and U denotes a subframe number of an UL subframe.

13. The method according to claim 6, wherein for TDD configuration 3, the bundled subframe set is one of the following:
Set 1: {D|D=10*k, k=0, 1, 2, . . . } and
{U|U=10*k+4, k=0, 1, 2, . . . }; and
Set 2: {D|D=X(mod(k,5))+10*floor(k/5), k=0, 1, 2, . . . } and
{U|U=Y(mod(k/2))+10*floor(k/2), k=0, 1, 2, . . . },
where X(0)=1, X(1)=5, X(2)=6, X(3)=7, X(4)=8; Y(0)=2, Y(1)=3,
wherein D denotes a subframe number of a DL subframe and U denotes a subframe number of an UL subframe.

14. The method according to claim 6, wherein for TDD configuration 4, the bundled subframe set is one of the following:
Set 1: {D|D=10*k+8, k=0, 1, 2, . . . } and {U|U=10*k+2, k=0, 1, 2, . . . }; and
Set 2: {D|D=10*k+9, k=0, 1, 2, . . . } and {U|U=10*k+3, k=0, 1, 2, . . . },
wherein D denotes a subframe number of a DL subframe and U denotes a subframe number of an UL subframe.

15. The method according to claim 6, wherein for TDD configuration 6, the bundled subframe set is one of the following:
Set 1: {D|D=X(mod(k,2))+25*floor(k/2), k=0, 1, 2, . . . } and
{U|U=Y(mod(k/2))+25*floor(k/2), k=0, 1, 2, . . . },
where X(0)=0, X(1)=11; Y(0)=7, Y(1)=18;
Set 2: {D|D=X(mod(k,2))+25*floor(k/2), k=0, 1, 2, . . . } and
{U|U=Y(mod(k/2))+25*floor(k/2), k=0, 1, 2, . . . },
where X(0)=1, X(1)=15; Y(0)=8, Y(1)=22;
Set 3: {D|D=X(mod(k,2))+25*floor(k/2), k=0, 1, 2, . . . } and
{U|U=Y(mod(k/2))+25*floor(k/2), k=0, 1, 2, . . . },
where X(0)=5, X(1)=16; Y(0)=12, Y(1)=23;

Set 4: {D|D=X(mod(k,2))+25*floor(k/2), k=0, 1, 2, ... }
and
{U|U=Y(mod(k/2))+25*floor(k/2), k=0, 1, 2, ... },
where X(0)=6, X(1)=19; Y(0)=13, Y(1)=24;
Set 5: {D|D=X(mod(k,2))+25*floor(k/2), k=0, 1, 2, ... }
and
{U|U=Y(mod(k/2))+25*floor(k/2), k=0, 1, 2, ... },
where X(0)=9, X(1)=20; Y(0)=14, Y(1)=27; and
Set 6: {D|D=X(mod(k,2))+25*floor(k/2), k=0, 1, 2, ... }
and
{U|U=Y(mod(k/2))+25*floor(k/2), k=0, 1, 2, ... },
where X(0)=10, X(1)=21; Y(0)=17, Y(1)=28,
wherein D denotes a subframe number of a DL subframe and U denotes a subframe number of an UL subframe.

16. A radio network node configured to perform TDM-based resource partition between two Radio Base Stations (RBSs) with which a User Equipment (UE) is to perform dual connectivity, the radio network node comprising:
    a subframe set forming unit configured to form at least two non-overlapping Uplink (UL) subframe sets and at least two non-overlapping Downlink (DL) subframe sets; and
    a subframe set allocating unit configured to allocate at least one of the UL subframe sets and at least one of the DL subframe sets exclusively to each of the RBSs to perform dual connectivity.

17. The radio network node according to claim 16, wherein the radio network node is one of the RBSs.

18. The radio network node according to claim 16, wherein the radio network node is a network node coupled to both of the RBSs.

19. A method for use in a dual connectivity enabled User Equipment (UE), comprising:

receiving Uplink (UL) subframe sets and Downlink (DL) subframe sets allocated to Radio Base Stations (RBSs) with which the UE is to perform dual connectivity, the UL subframe sets respectively allocated to the RBSs being non-overlapping and the DL subframe sets respectively allocated to the RBSs being non-overlapping; and
    performing dual connectivity with the RBSs by performing transmissions to the RBSs in the UL subframe sets allocated to the respective RBSs and performing receptions from the RBSs in the DL subframe sets allocated to the respective RBSs.

20. A dual connectivity enabled User Equipment (UE) comprising a receiver, a transmitter, a memory and a processor,
    the processor is configured to control the receiver to receive Uplink (UL) subframe sets and Downlink (DL) subframe sets allocated to Radio Base Stations (RBSs) with which the UE is to perform dual connectivity, the UL subframe sets respectively allocated to the RBSs are non-overlapping and the DL subframe sets respectively allocated to the RBSs are non-overlapping;
    the memory is configured to store the received UL subframe sets and DL subframe sets; and
    the processor is further configured to control the transmitter to perform transmissions to the RBSs in the stored UL subframe sets allocated to the respective RBSs and to control the receiver to perform receptions from the RBSs in the stored DL subframe sets allocated to the respective RBSs.

* * * * *

UNITED STATES PATENT AND TRADEMARK OFFICE
CERTIFICATE OF CORRECTION

PATENT NO. : 9,641,271 B2
APPLICATION NO. : 14/125507
DATED : May 2, 2017
INVENTOR(S) : Song et al.

It is certified that error appears in the above-identified patent and that said Letters Patent is hereby corrected as shown below:

In the Specification

In Column 5, Line 14, delete "(HARQ-AC K)" and insert -- (HARQ-ACK) --, therefor.

In Column 7, Line 3, delete "floor(k3)," and insert -- floor(k/3), --, therefor.

In Column 7, Line 5, delete "floor(k3)," and insert -- floor(k/3), --, therefor.

In Column 7, Line 8, delete "floor(k3)," and insert -- floor(k/3), --, therefor.

In Column 7, Line 10, delete "floor(k3)," and insert -- floor(k/3), --, therefor.

In Column 7, Line 13, delete "floor(k3)," and insert -- floor(k/3), --, therefor.

In Column 7, Line 15, delete "floor(k3)," and insert -- floor(k/3), --, therefor.

In Column 7, Line 18, delete "floor(k3)," and insert -- floor(k/3), --, therefor.

In Column 7, Line 20, delete "floor(k3)," and insert -- floor(k/3), --, therefor.

In Column 7, Line 23, delete "floor(k3)," and insert -- floor(k/3), --, therefor.

In Column 7, Line 25, delete "floor(k3)," and insert -- floor(k/3), --, therefor.

In Column 7, Line 28, delete "floor(k3)," and insert -- floor(k/3), --, therefor.

In Column 7, Line 30, delete "floor(k3)," and insert -- floor(k/3), --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,641,271 B2

In Column 7, Line 33, delete "floor(k3)," and insert -- floor(k/3), --, therefor.

In Column 7, Line 35, delete "floor(k3)," and insert -- floor(k/3), --, therefor.

In Column 8, Line 33, delete "floor(k2)," and insert -- floor(k/2), --, therefor.

In Column 8, Line 39, delete "floor(k2)," and insert -- floor(k/2), --, therefor.

In Column 8, Line 47, delete "floor(k4)," and insert -- floor(k/4), --, therefor.

In Column 8, Line 51, delete "floor(k4)," and insert -- floor(k/4), --, therefor.

In Column 8, Line 59, delete "floor(k5)," and insert -- floor(k/5), --, therefor.

In Column 8, Line 61, delete "Y(mod(k2))+10*floor(k2)," and
insert -- Y(mod(k/2))+10*floor(k/2), --, therefor.

In Column 9, Line 5, delete "floor(k2)," and insert -- floor(k/2), --, therefor.

In Column 9, Line 7, delete "Y(mod(k2))+25*floor(k2),"
and insert -- Y(mod(k/2))+25*floor(k/2), --, therefor.

In Column 9, Line 9, delete "floor(k2)," and insert -- floor(k/2), --, therefor.

In Column 9, Line 11, delete "Y(mod(k2))+25*floor(k2)," and
insert -- Y(mod(k,2))+25*floor(k/2), --, therefor.

In Column 9, Line 13, delete "floor(k2)," and insert -- floor(k/2), --, therefor.

In Column 9, Line 15, delete "Y(mod(k2))+25*floor(k2)," and
insert -- Y(mod(k/2))+25*floor(k/2), --, therefor.

In Column 9, Line 17, delete "floor(k2)," and insert -- floor(k/2), --, therefor.

In Column 9, Line 19, delete "Y(mod(k2))+25*floor(k2)," and
insert -- Y(mod(k/2))+25*floor(k/2), --, therefor.

In Column 9, Line 21, delete "floor(k2)," and insert -- floor(k/2), --, therefor.

In Column 9, Line 23, delete "Y(mod(k2))+25*floor(k2)," and
insert -- Y(mod(k/2))+25*floor(k/2), --, therefor.

In Column 9, Line 25, delete "floor(k2)," and insert -- floor(k/2), --, therefor.
In Column 9, Line 27, delete "Y(mod(k2))+25*floor(k2)," and insert -- Y(mod(k/2))+25*floor(k/2), --, therefor.

In the Claims

In Column 12, Line 39, in Claim 13, delete "Y(mod(k/2))" and insert -- Y(mod(k,2)) --, therefor.